(12) United States Patent
Takagi

(10) Patent No.: US 7,336,335 B2
(45) Date of Patent: Feb. 26, 2008

(54) SUBSTRATE FOR LIQUID CRYSTAL DISPLAY DEVICE AND LIQUID CRYSTAL DISPLAY DEVICE INCLUDING THE SAME

(75) Inventor: Takashi Takagi, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 414 days.

(21) Appl. No.: 11/034,448

(22) Filed: Jan. 12, 2005

(65) Prior Publication Data
US 2006/0033877 A1    Feb. 16, 2006

(30) Foreign Application Priority Data
Aug. 13, 2004  (JP) ............................. 2004-235821

(51) Int. Cl.
G02F 1/1339  (2006.01)
G02F 1/1333  (2006.01)

(52) U.S. Cl. .................. 349/155; 349/156; 349/158

(58) Field of Classification Search ............... 349/155, 349/156, 158
See application file for complete search history.

(56) References Cited

U.S. PATENT DOCUMENTS 6,147,729 A * 11/2000 Kurauchi et al. ........... 349/106
6,975,379 B2 * 12/2005 Kim et al. .................. 349/155
2006/0238692 A1 * 10/2006 Hirato et al. ............... 349/155

FOREIGN PATENT DOCUMENTS

JP   2000-298280    10/2000

* cited by examiner

Primary Examiner—Mike Qi
(74) Attorney, Agent, or Firm—Greer, Burns & Crain, Ltd.

(57) ABSTRACT

The invention relates to a substrate for a liquid crystal display device used as a display part of an electronic equipment and a liquid crystal display device including the same, and has an object to provide a substrate for a liquid crystal display device in which high manufacturing yield and excellent display quality can be obtained, and a liquid crystal display device including the same. The substrate for the liquid crystal display device includes a base substrate for holding a liquid crystal in cooperation with an opposite substrate arranged to be opposite thereto, and a pillar spacer provided to maintain a cell gap between the base substrate and the opposite substrate, wherein the pillar spacer includes a first layer formed on the base substrate to linearly extend in a first direction and to have an almost constant width W in a second direction orthogonal to the first direction, and a second layer which is patterned to partially overlap with the first layer at an overlap accuracy X and in which a width in the first direction is almost constant and a length L1 in the second direction satisfies a relation of $L1 \geq W+2X$.

15 Claims, 19 Drawing Sheets

SUBSTRATE FOR LIQUID CRYSTAL DISPLAY DEVICE AND LIQUID CRYSTAL DISPLAY DEVICE INCLUDING THE SAME

BACKGROUND OF THE INVENTION

1. Field of the Invention

The present invention relates to a substrate for a liquid crystal display device used as a display part or the like of an electronic equipment and a liquid crystal display device including the same.

2. Description of the Related Art

As spacers for maintaining the cell gap of a liquid crystal display device, there are bead spacers scattered on a substrate surface, and photo spacers (pillar spacers) formed on a substrate by using a photolithography method or the like. In a recent liquid crystal display device, to use the pillar spacer is going mainstream. When the pillar spacer is used, an improvement in contrast and display grade (uneven display) is made as compared with the use of the bead spacer, and the display quality of the liquid crystal display device is improved. The pillar spacer is formed at an arbitrary position of a light shielding part on a substrate by laminating, for example, color filter (CF) resin layers or the like.

FIG. 20 shows a structure of an opposite substrate of a conventional liquid crystal display device including a pillar spacer. FIG. 20 shows a region corresponding to a storage capacitor part of two pixel regions. FIG. 21 shows a sectional structure of the opposite substrate taken along line X-X of FIG. 20. As shown in FIGS. 20 and 21, a light shielding film (BM) 148 for defining a pixel region and shading the storage capacitor part is formed on a glass substrate 111. A CF resin layer 140 (140R, 140G and 140B) of one color of red (R), green (G) and blue (B) is formed in each pixel region. The CF resin layers 140R, 140G and 140B of the three colors are laminated in a pillar spacer formation region on the BM 148. A common electrode 142 made of a transparent conductive film is formed on the CF resin layer 140 and on the whole surface of the substrate. Linear projections 144 extending obliquely with respect to pixel region end parts are formed on the common electrode 142 as alignment regulating structures for regulating the alignment of liquid crystal. An auxiliary spacer layer 151 is formed in the pillar spacer formation region on the common electrode 142. By this, a pillar spacer 150 made of lamination layers of the CF resin layers 140R, 140G, and 140B, and the auxiliary spacer layer 151 and having a specified height is formed in the pillar spacer formation region. When the upper bottom size (width) of the lamination part of the CF resin layers 140R, 140G and 140B is made 26 μm, the upper bottom size of the pillar spacer 150 becomes about 25 μm.

When the opposite substrate is attached to a thin film transistor (TFT) substrate, the upper bottom surface of the pillar spacer 150 comes in contact with the TFT substrate to have a specified contact area. When the total sum of the contact areas of the plurality of pillar spacers 150 with respect to the TFT substrate is increased, a hard liquid crystal display panel excellent in pressure resistance characteristics can be obtained.

The auxiliary spacer layer 151 is patterned by using a mirror projection exposure system or a proximity exposure system. At the time of patterning of the auxiliary spacer layer 151, an overlap shift can occur in the range of overlap accuracy of an exposure device. When the overlap shift occurs in the lamination part of the CF resin layer 140 at the time of patterning of the auxiliary spacer layer 151, the shape of the pillar spacer 150 and the upper bottom size are changed. That is, the contact area of the pillar spacer 150 with respect to the TFT substrate is changed.

FIG. 22 shows a sectional structure of the opposite substrate in which the overlap shift occurs in the auxiliary spacer layer 151. In an auxiliary spacer layer 151', the overlap shift occurs by 4 μm in the direction of an arrow 160 with respect to the lamination part of the CF resin layer 140. By this, the upper bottom size of the pillar spacer 150' becomes about 21 μm, and as compared with the upper bottom size of the pillar spacer 150 shown in FIGS. 20 and 21, it is decreased by about 4 μm. For example, when it is assumed that the comparable overlap shift occurs also in the direction vertical to the paper surface of FIG. 22, the upper bottom area (contact area with respect to the TFT substrate) of the pillar spacer 150' is decreased by about 30% as compared with the upper bottom area of the pillar spacer 150. Accordingly, the pillar spacer 150' becomes softer than the pillar spacer 150, and becomes easy to be deformed by about 30%.

The pillar spacer 150 or 150' is generally formed by using resin material such as acryl resin or novolac resin. The pillar spacer 150 or 150' made of the resin material is not a perfect elastic body, but has an elastic deformation region and a plastic deformation region. Thus, when a local force is applied to a liquid crystal display panel, the pillar spacer 150 or 150' is plastically deformed, and even if the force is removed, the pillar spacer 150 or 150' is not returned to the original height. Since the soft pillar spacer is plastically deformed by a weak force, in the soft liquid crystal display panel in which the pillar spacer 150' is formed, uneven cell thickness due to pressurization is apt to occur in a panel process, and manufacturing yield and display quality are degraded. Accordingly, when the overlap accuracy of the exposure device is considered, in the conventional liquid crystal display device, there arises a problem that it is difficult to obtain high manufacturing yield and excellent display quality.

FIG. 23 shows a structure of one pixel of another conventional liquid crystal display device. FIG. 24 shows a sectional structure of the liquid crystal display device taken along line Y-Y of FIG. 23. As shown in FIGS. 23 and 24, the liquid crystal display device includes a thin film transistor (TFT) substrate 102, an opposite substrate 104, and a liquid crystal 106 sealed between both the substrates 102 and 104. The TFT substrate 102 includes a plurality of gate bus lines 112 extending in the horizontal direction in FIG. 23, a plurality of drain bus lines 114 intersecting with the gate bus lines 112 through an insulating film 130 and extending in the vertical direction in FIG. 23 on a glass substrate 110. A TFT 120 is formed in the vicinity of each of the intersecting positions of the gate bus lines 112 and the drain bus lines 114. Pixel regions are defined by the gate bus lines 112 and the drain bus lines 114. A storage capacitor bus line 118 extending in parallel to the gate bus line 112 is formed to cross each of the pixel regions. The storage capacitor bus line 118 functions as one electrode of a storage capacitor part. A storage capacitor electrode 119 is formed on the storage capacitor bus line 118 through an insulating film 130. The storage capacitor electrode 119 is formed in each of the pixel regions, and functions as the other electrode of the storage capacitor part. A protection film 132 is formed on the storage capacitor electrode 119 and on the whole surface of the substrate. A pixel electrode 116 is formed on the protection film 132 in each of the pixel regions. In the storage capacitor part, the height from the surface of the glass substrate 110 is higher than a peripheral opening part by the formation of the storage capacitor bus line 118 and the storage capacitor electrode 119.

On the other hand, a pillar spacer 150 made of a single resin layer is formed at the side of the opposite substrate 104. The pillar spacer 150 is arranged in a light shielding region of the opposite substrate 104 and at a position which is opposed to the storage capacitor part when the opposite substrate is attached to the TFT substrate 102. Almost the whole region of the upper bottom surface (the lower surface in FIG. 24) of the pillar spacer 150 is in contact with the pixel electrode 116 on the storage capacitor part.

Here, when the TFT substrate 102 and the opposite substrate 104 are attached to each other, an attaching shift can occur in the range of attaching accuracy of a substrate attaching device. FIG. 25 shows a sectional structure of the liquid crystal display device in which the attaching shift occurs. As shown in FIG. 25, the relative attaching shift occurs in the direction of a thick arrow between both the substrates 102 and 104. Since a part of the upper bottom surface of the pillar spacer 150 does not come in contact with the pixel electrode 116 on the storage capacitor part, the contact area of the pillar spacer 150 with respect to the TFT substrate 102 is decreased. When the contact area of the pillar spacer 150 with respect to the TFT substrate 102 becomes small, the liquid crystal display panel becomes soft and its pressure resistance characteristics are low.

In the structure shown in FIG. 24, in addition to the attaching shift of the substrates 102 and 104, due to factors such as an overlap shift of the respective layers of the storage capacitor part, and variations in the sizes of the pillar spacer 150, the storage capacitor bus line 118 and the storage capacitor electrode 119, there is also a case where the contact area of the pillar spacer 150 with respect to the TFT substrate 2 is decreased.

The soft liquid crystal display panel causes a poor display and degradation in pressure resistance characteristics due to local uneven cell thickness. Accordingly, when the attaching accuracy and the like of the substrates 102 and 104 are considered, in the conventional liquid crystal display device, there arises a problem that it is difficult to obtain high manufacturing yield and excellent display quality. The problem can be avoided by securing a sufficient design margin for the position and size of the pillar spacer 150. However, in order to secure the design margin without decreasing the upper bottom area of the pillar spacer 150, it is necessary to widen the width of the storage capacitor part, and therefore, there arises newly a problem that the aperture ratio of a pixel is lowered.

[Patent document 1] JP-A-2000-298280

SUMMARY OF THE INVENTION

An object of the present invention is to provide a substrate for a liquid crystal display device in which high manufacturing yield and excellent display quality can be obtained, and a liquid crystal display device including the same.

The above object is achieved by a substrate for a liquid crystal display device, which includes a base substrate for holding a liquid crystal in cooperation with an opposite substrate arranged to be opposite thereto, and a pillar spacer provided to maintain a cell gap between the base substrate and the opposite substrate, wherein the pillar spacer includes a first layer formed on the base substrate to linearly extend in a first direction and to have an almost constant width W in a second direction orthogonal to the first direction, and a second layer which is patterned to partially overlap with the first layer at an overlap accuracy X and in which a width in the first direction is almost constant and a length L1 in the second direction satisfies a relation of $L1 \geq W + 2X$.

According to the invention, the liquid crystal display device can be realized in which high manufacturing yield and excellent display quality can be obtained.

DESCRIPTION OF THE PREFERRED EMBODIMENTS

Figure 1A:
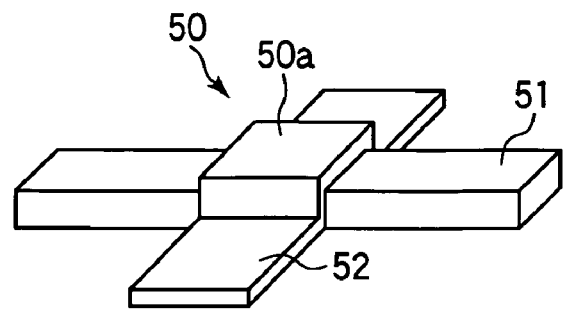
FIGS. 1A to 1C are views showing a first basic structure of a liquid crystal display device according to an embodiment of the invention.
Figure 1B:
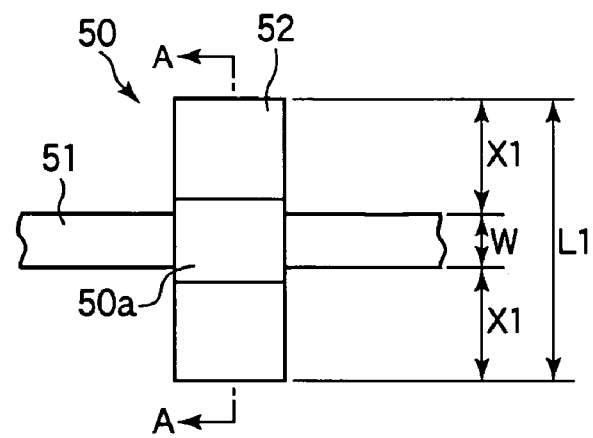
Figure 1C:
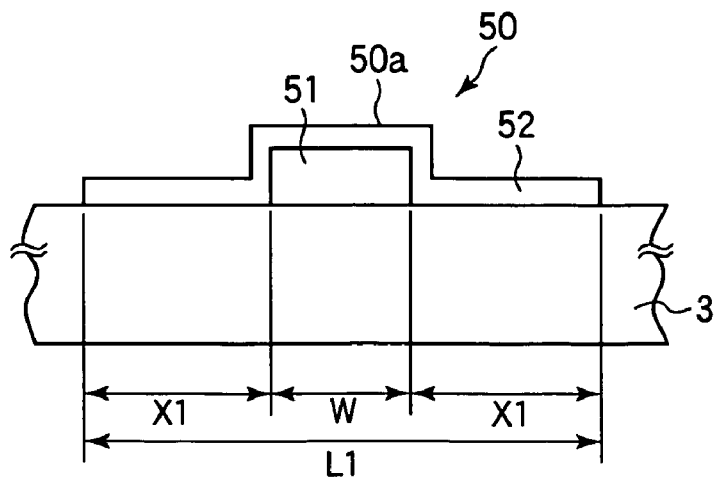

A substrate for a liquid crystal display device according to an embodiment of the present invention and a liquid crystal display device including the same will be described with reference to FIGS. 1A to 19B. First, a first basic structure of this embodiment will be described with reference to FIGS. 1A to 1C. FIG. 1A is a perspective view schematically showing a structure of a pillar spacer 50 which is ideally patterned and formed on one substrate. FIG. 1B shows a structure of the pillar spacer 50 when viewed in a direction vertical to a substrate surface, and FIG. 1C shows a sectional structure of the pillar spacer 50 taken along line A-A of FIG. 1B. As shown in FIGS. 1A to 1C, the pillar spacer 50 includes on one substrate (base substrate) 3 a first layer 51 extending linearly in the horizontal direction of FIG. 1B, and a second layer 52 formed to partially overlap with the first layer 51 and linearly extending in the vertical direction of FIG. 1B. A width W of the first layer 51 in the vertical direction of FIG. 1B is almost constant. A width of the second layer 52 in the horizontal direction of FIG. 1B is almost constant, and a length L1 in the vertical direction of FIG. 1B satisfies a relation of $L1 \geq W+2X$ (here, X denotes an overlap accuracy of an exposure device used when the second layer 52 is patterned). As shown in FIGS. 1A to 1C, in the ideally patterned state, the second layer 52 protrudes from each of side end parts at both sides of the first layer 51 by a length $X1 (\geq X)$. In the surface of the pillar spacer 50, a region where the first layer 51 and the second layer 52 overlap with each other is an upper bottom surface 50a whose height from the substrate surface is highest. When the substrate is attached to an opposite substrate arranged to be opposite thereto, the upper bottom surface 50a of the pillar spacer 50 comes in contact with the surface of the opposite substrate.

Here, the second layer 52 is patterned by using, for example, a mirror projection exposure system. The overlap accuracy X of the exposure device used in the mirror projection exposure system is about 1.5 μm at ±3σ. Accordingly, when the second layer 52 is designed, the length X1 by which the first layer 51 protrudes from each of both the side end parts is made 1.5 μm or more, so that the length L1 satisfies the relation of $L1 \geq W+3$ μm. Since the width of the second layer 52 is almost constant, when the second layer 52 is patterned, even if a patterning shift of ±1.5 μm occurs in the vertical direction of FIG. 1B, the area of the upper bottom surface 50a of the pillar spacer 50 is not changed. Besides, since the width W of the first layer 51 is almost constant, when the second layer 52 is patterned, even if a patterning shift of ±1.5 μm occurs in the horizontal direction of FIG. 1B, the area of the upper bottom surface 50a of the pillar spacer 50 is not changed. That is, according to this basic structure, even if the position shift occurs in the second layer 52 in the range of the overlap accuracy X of the exposure device, the area of the upper bottom surface 50a of the pillar spacer 50 is not changed, and the contact area with respect to the other substrate is not also changed. Since the hardness of the liquid crystal display panel depends on the contact area of the pillar spacer 50, according to this basic structure, even if the overlap accuracy X of the exposure device is considered, a poor display and degradation in pressure resistance characteristics due to local uneven cell thickness do not occur. Incidentally, in the case where the second layer 52 is patterned by using a proximity exposure system, since the overlap accuracy X of an exposure device used for the proximity exposure system is about 3 μm at ±3σ, it is sufficient if the length L1 is made to satisfy the relation of $L1 \geq W+6$ μm. That is, when the second layer 52 is designed, the length X1 is made 3 μm or more.

Figure 2A:
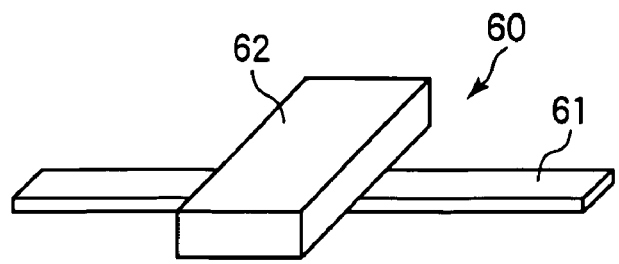
FIGS. 2A to 2C are views showing a second basic structure of a liquid crystal display device according to the embodiment of the invention.
Figure 2B:
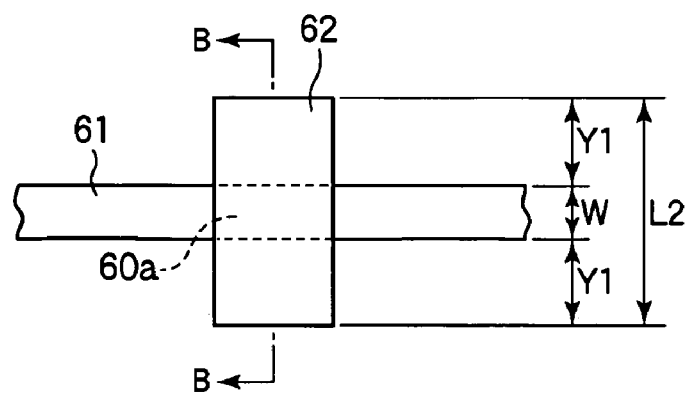
Figure 2C:
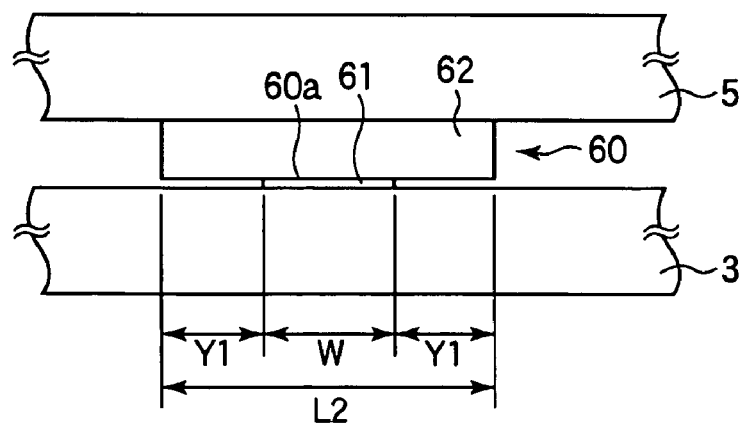

Next, a second basic structure of this embodiment will be described with reference to FIGS. 2A to 2C. FIG. 2A is a perspective view schematically showing a structure of a pillar spacer 60 in a state where a pair of substrates are attached to each other without a shift. FIG. 2B shows a structure of the pillar spacer 60 when viewed in a direction vertical to the substrate surface, and FIG. 2C shows a sectional structure of the pillar spacer 60 taken along line B-B of FIG. 2B and substrates 3 and 5. As shown in FIGS. 2A to 2C, the pillar spacer 60 includes a first layer 61 extending linearly in the horizontal direction of FIG. 2B, and a second layer 62 partially overlapping with the first layer 61 and linearly extending in the vertical direction of FIG. 2B. The first layer 61 is formed on the one substrate 3, and the second layer 62 is formed on the other substrate 5. The first layer 61 and the second layer 62 come in contact with each other through a contact interface 60a when both the substrates 3 and 5 are boned to each other. A width W of the first layer 61 in the vertical direction of FIG. 2B is almost constant. A width of the second layer 62 in the horizontal direction of FIG. 2B is almost constant, and a length L2 in the vertical direction in FIG. 2B satisfies a relation of $L2 \geq W+2Y$ (here, Y denotes an attaching accuracy at the time when both the substrates 3 and 5 are attached). As shown in FIGS. 2A to 2C, in the state where both the substrates 3 and 5 are attached without a shift, the second layer 62 protrudes from each of both side end parts of the firs layer 61 by a length $Y1 (\geq Y)$.

The attaching accuracy Y of the substrates 3 and 5 is generally about 4 μm (±4 μm). Accordingly, when the second layer 62 is designed, the length Y1 by which the second layer protrudes from each of both the end parts of the first layer 61 is made 4 μm or more, and the length L2 is made to satisfy a relation of $L2 \geq W+8$ μm. Since the width of the second layer 62 is almost constant, even if the attaching shift of ±4 μm occurs in the vertical direction of FIG. 2B, the area of the contact interface 60a of the pillar spacer 60 is not changed. Besides, since the width W of the first layer 61 is almost constant, even if the attaching shift of ±4 μm occurs in the horizontal direction of FIG. 2B, the area of the contact surface 60a of the pillar spacer 60 is not changed. That is, according to this basis structure, even if the attaching shift of the substrates 3 and 5 occurs in the range of the attaching accuracy Y, the area of the contact interface 60a of the pillar spacer 60 is not changed. Since the hardness of the liquid crystal display panel depends on the area of the contact interface 60a, according to this basic structure, even if the attaching accuracy Y is considered, a poor display and degradation in pressure resistance characteristics due to local uneven cell thickness do not occur.

As described above, according to this embodiment, since the poor display and the degradation in pressure resistance characteristics due to the local uneven cell thickness do not occur, the liquid crystal display device can be realized in which high manufacturing yield and excellent display quality can be obtained. Herein after, a substrate for a liquid crystal display device according to this embodiment and a liquid crystal display device including the same will be described more specifically by use of examples.

EXAMPLE 1

Figure 3B:
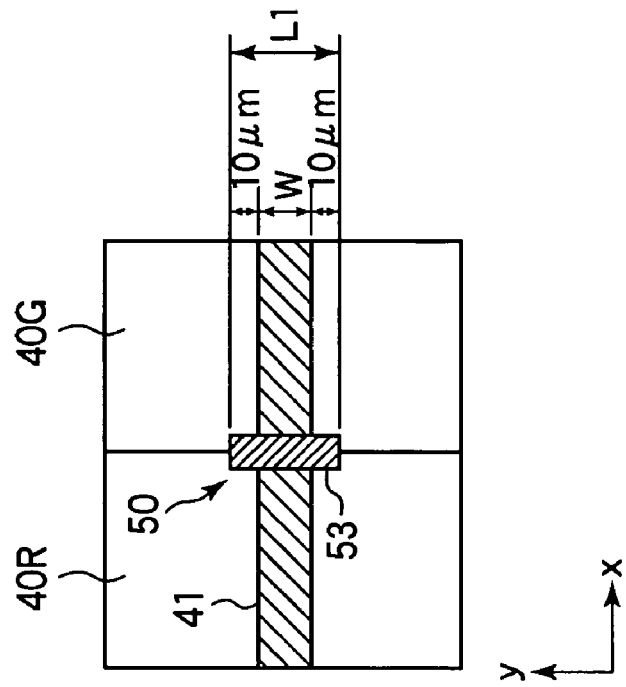
FIGS. 3A and 3B are views showing a structure of a substrate for a liquid crystal display device according to example 1 of the embodiment of the invention.
Figure 3A:
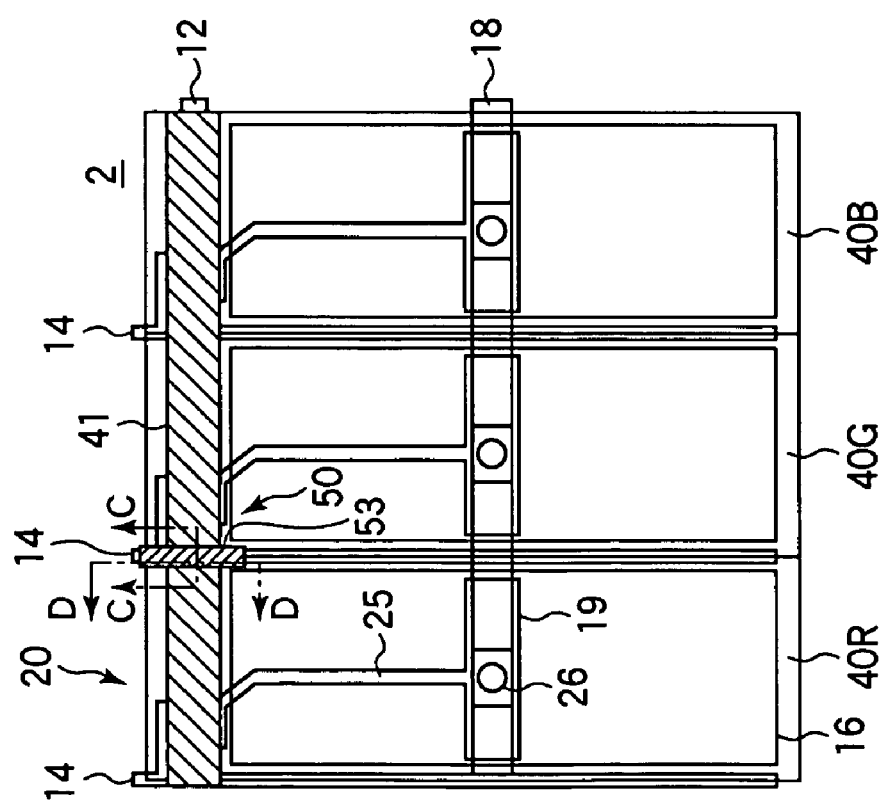
Figure 4A:
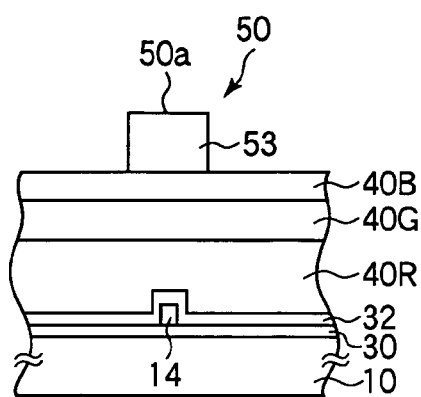
FIGS. 4A and 4B are sectional views showing a structure of the substrate for the liquid crystal display device according to example 1 of the embodiment of the invention.
Figure 4B:
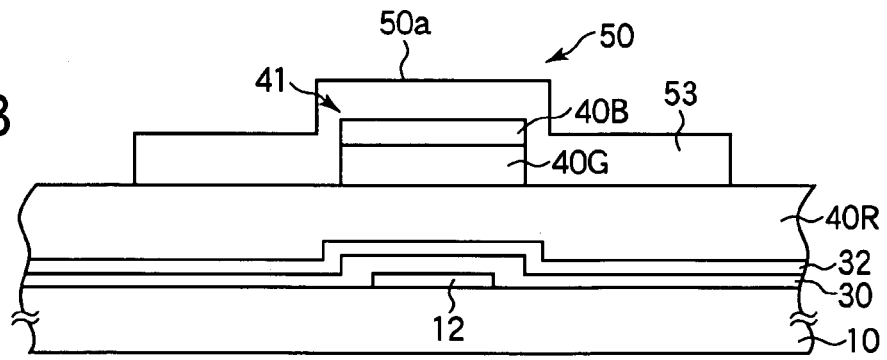

First, a substrate for a liquid crystal display device according to example 1 of this embodiment and a liquid crystal display device including the same will be described. FIG. 3A shows a structure of a TFT substrate of a CF-on-TFT (COT) structure according to this example. FIG. 3B is an enlarged view showing a vicinity of a pillar spacer. FIG. 4A shows a sectional structure taken along line C-C of FIG. 3A, and FIG. 4B shows a sectional structure taken along line D-D of FIG. 3A. FIGS. 3A to 4B show a state in which the pillar spacer is ideally patterned. As shown in FIGS. 3A to 4B, a TFT substrate 2 includes a plurality of gate bus lines 12 extending in the horizontal direction of the drawing, and a plurality of drain bus lines 14 intersecting with the gate bus lines 12 through an insulating film (gate insulating film) 30 and extending in the vertical direction of the drawing. A TFT 20 is formed in the vicinity of each of intersecting positions of the gate bus lines 12 and the drain bus lines 14. A drain electrode of the TFT 20 is electrically connected to the drain bus line 14. A part of the gate bus line 12 functions as a gate electrode of the TFT 20. A protection film 32 is formed on the TFT 20 and on the whole surface of the substrate.

Pixel regions are defined by the gate bus lines 12 and the drain bus lines 14. A CF resin layer 40 (40R, 40G, 40B) of one color of R, G and B is formed in each of the pixel regions on the protection film 32. A resin overlap part 41 in which three layers of the CF resin layers 40R, 40G and 40B are laminated is formed on the gate bus line 12. The resin overlap part 41 linearly extends along the gate bus line 12, and has an almost constant width W. The resin overlap part 41 has a function to shade the TFT 20. A storage capacitor bus line 18 crossing each of the pixel regions and extending in parallel to the gate bus line 12 is formed. The storage capacitor bus line 18 functions as one electrode of a storage capacitor part. A storage capacitor electrode 19 is formed on the storage capacitor bus line 18 through an insulating film. The storage capacitor electrode 19 is formed in each of the pixel regions, and functions as the other electrode of the storage capacitor part. The storage capacitor electrode 19 is electrically connected to a source electrode of the TFT 20 through a connection electrode 25. A pixel electrode 16 is formed on the CF resin layer 40 and in each of the pixel regions. The pixel electrode 16 is electrically connected to the storage capacitor electrode 19 through a contact hole 26 opened in the CF resin layer 40 and the protection film 32.

An auxiliary spacer layer 53 is formed on the resin overlap part 41 at an arrangement density of one per several to several tens of pixels. The auxiliary spacer layer 53 is almost orthogonal to the resin overlap part 41, linearly extends, and is formed to overlap with the drain bus line 14. The resin overlap part 41 functions as a first layer of a pillar spacer 50, and the auxiliary spacer layer 53 functions as a second layer of the pillar spacer 50. A width of the auxiliary spacer layer 53 is almost constant, and a length L1 satisfies a relation of $L1 \geq W+2X$ (here, X denotes an overlap accuracy of an exposure device used when the auxiliary spacer layer 53 is patterned). As shown in FIG. 3B, in a state where patterning is ideally made, the auxiliary spacer layer 53 protrudes from each of both side end parts of the resin overlap part 41 by, for example, a length of 10 μm ($\geq X$). When the substrate is attached to a common electrode substrate (not shown) arranged to be opposite thereto, an upper bottom surface 50a of the pillar spacer 50 comes in contact with the surface of the common electrode substrate.

Figure 5:
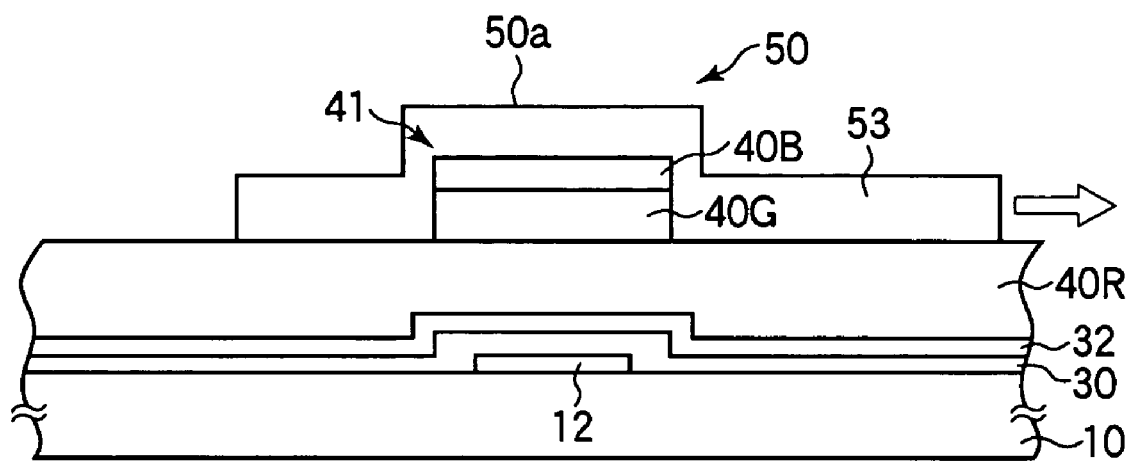
FIG. 5 is a sectional view showing a structure of the substrate for the liquid crystal display device in which an overlap shift occurs in an auxiliary spacer layer.

FIG. 5 shows a sectional structure of the TFT substrate in which an overlap shift occurs when the auxiliary spacer layer 53 is patterned. As shown in FIG. 5, the overlap shift occurs in the auxiliary spacer layer 53 in the direction of a thick arrow (+y direction of FIG. 3B) with respect to the resin overlap part 41. However, the width of the auxiliary spacer layer 53 is almost constant, and the auxiliary spacer layer 53 is designed to protrude from each of both the side end parts of the resin overlap part 41 by the length of 10 μm which is not smaller than the overlap accuracy X of the exposure device. Accordingly, even if the overlap shift in ±y direction occurs in the auxiliary spacer layer 53, the area of the upper bottom surface 50a of the pillar spacer 50 is not changed. Since the overlap shift of the auxiliary spacer layer 53 is at most about ±4 μm, even if the length L1 is changed by about ±2 μm due to variations in sizes at the time of patterning, the area of the upper bottom surface 50a is not changed. Besides, since the width W of the resin overlap part 41 is almost constant, even if the overlap shift in ±x direction occurs in the auxiliary spacer layer 53, the area of the upper bottom surface 50a of the pillar spacer 50 is not changed. That is, in this example, the area of the upper bottom surface 50a is not changed by the variations which can occur in a normal manufacturing process of the TFT substrate 2. Accordingly, according to this example, a poor display and degradation in pressure resistance characteristics due to local uneven cell thickness do not occur, and the liquid crystal display device can be realized in which high manufacturing yield and excellent display quality can be obtained.

Figure 6A:
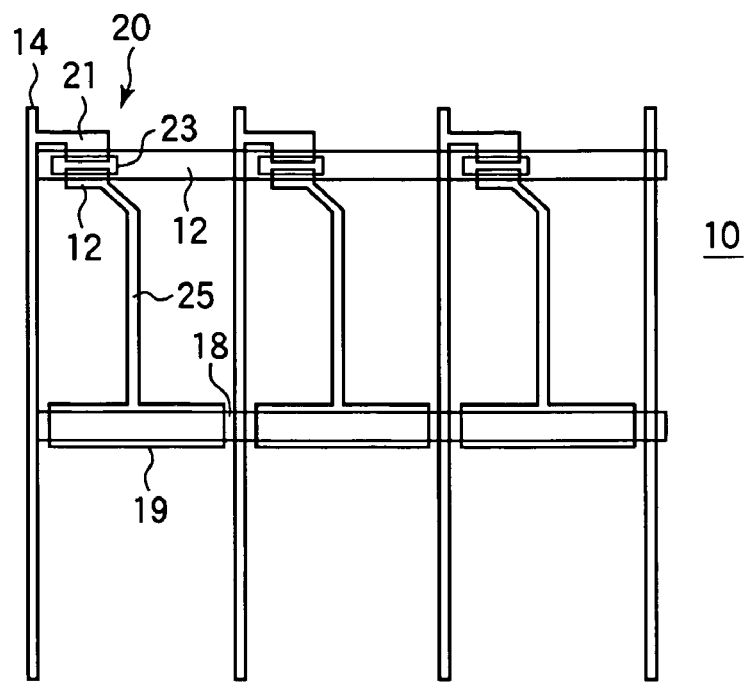
FIGS. 6A and 6B are views showing a manufacturing method of the substrate for the liquid crystal display device according to example 1 of the embodiment of the invention.

Next, a manufacturing method of the substrate for the liquid crystal display device according to this example and the liquid crystal display device including the same will be described. FIGS. 6A to 9 show the manufacturing method of the substrate for the liquid crystal display device according to this example and the liquid crystal display device including the same. FIGS. 6A to 8 show states when viewed in the direction vertical to the substrate surface, and FIG. 9 is a sectional view showing a state taken at a position corresponding to line D-D of FIG. 3A. First, as shown in FIG. 6A, a metal layer is formed on a glass substrate 10, and patterning is made, so that gate bus lines 12 and storage capacitor bus lines 18 are formed. Next, an insulating film, an amorphous silicon (a-Si) film and a silicon nitride film (SiN film) are continuously formed. Subsequently, the SiN film is patterned to form a channel protection film 23. Next, an n$^+$a-Si film and a metal layer are formed on the whole surface of the substrate. Subsequently, the metal layer, the n$^+$a-Si film and the a-Si film are patterned to form drain bus lines 14, drain electrodes 21, source electrodes 22, connection electrodes 25, storage capacitor electrodes 19 and an operational semiconductor layer 27 (not shown in FIG. 6A). In the process up to now, a TFT 20 is formed at each of intersecting positions of the gate bus lines 12 and the drain bus lines 14. Next, for example, a SiN film is formed on the whole surface of the substrate and a protection film is formed.

Figure 6B:
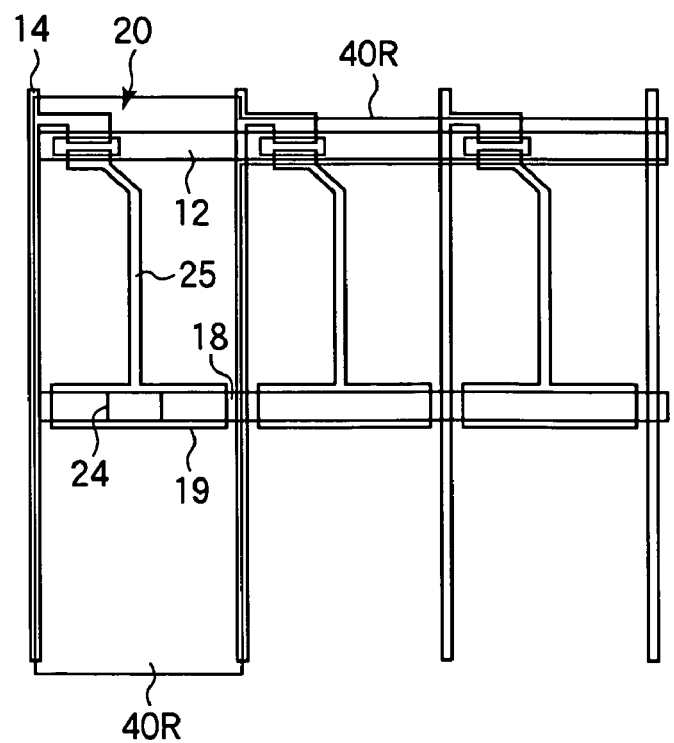

Next, as shown in FIG. 6B, a pigment dispersion type colored resin of R or the like is coated on the whole surface of the substrate and patterning is made, so that a CF resin layer 40R is formed. The CF resin layer 40R is formed also in a region on the gate bus line 12 in order to shade the TFT 20 in addition to the pixel region of R. An opening part 24 is formed in a part of the CF resin layer 40R on the storage capacitor electrode 19.

Figure 7A:
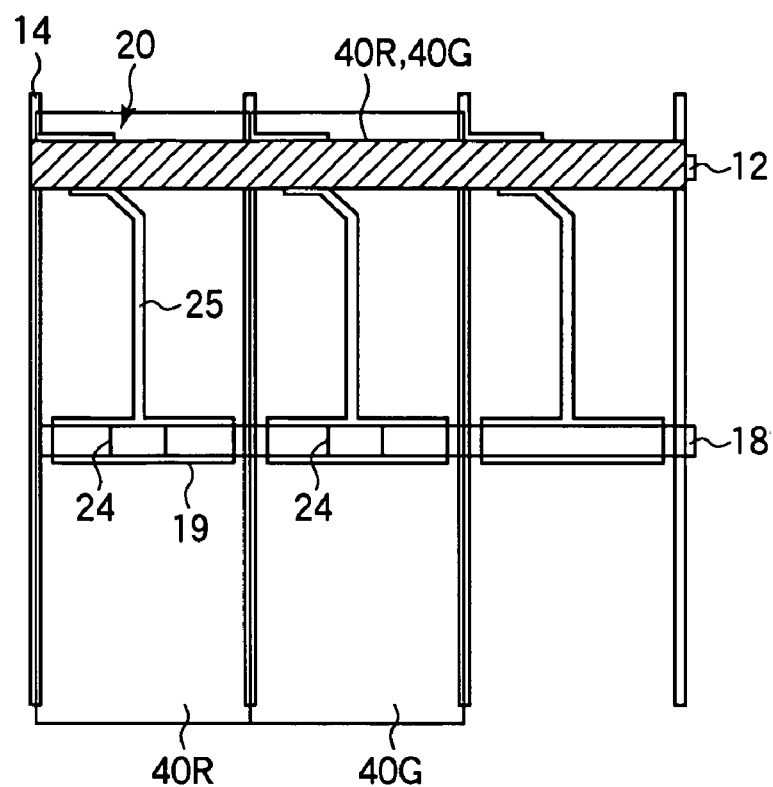
FIGS. 7A and 7B are views showing the manufacturing method of the substrate for the liquid crystal display device according to example 1 of the embodiment of the invention.

Next, as shown in FIG. 7A, a pigment dispersion type colored resin of G or the like is coated on the whole surface of the substrate and patterning is made, so that a CF resin layer 40G is formed. The CF resin layer 40G is formed also in a region on the gate bus line 12 in addition to the pixel region of G. An opening part 24 is formed in a part of the CF resin layer 40G on the storage capacitor electrode 19.

Figure 7B:
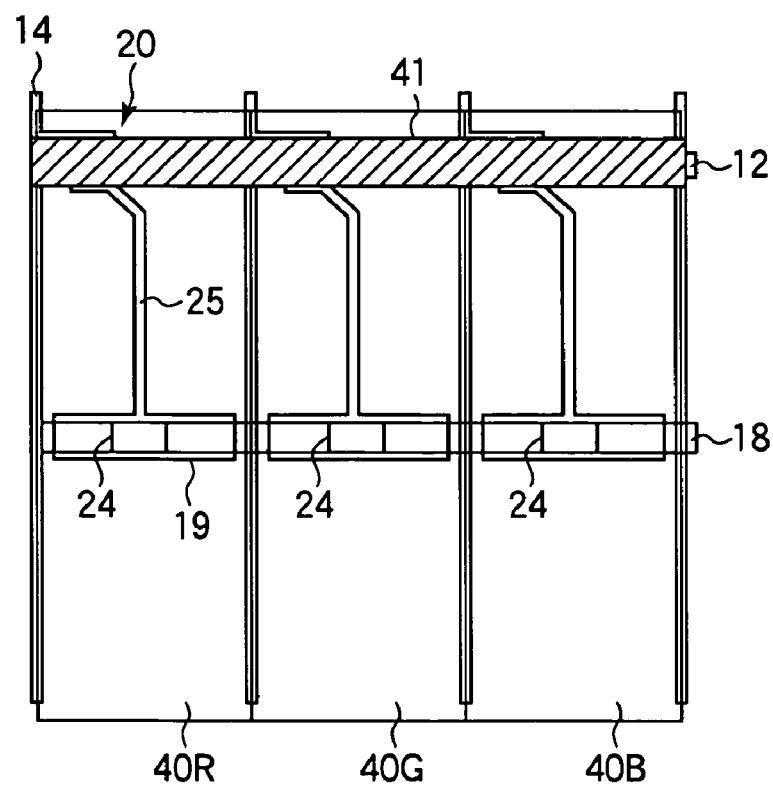

Next, as shown in FIG. 7B, a pigment dispersion type colored resin of B or the like is coated on the whole surface of the substrate and patterning is made, so that a CF resin layer 40B is formed. The CF resin layer 40B is formed also in a region on the gate bus line 12 in addition to the pixel region of B. By this, a resin overlap part 41 in which the CF resin layers 40R, 40G and 40B are laminated is formed in the region on the gate bus line 12. An opening part 24 is formed in a part of the CF resin layer 40B on the storage capacitor electrode 19.

Figure 8:
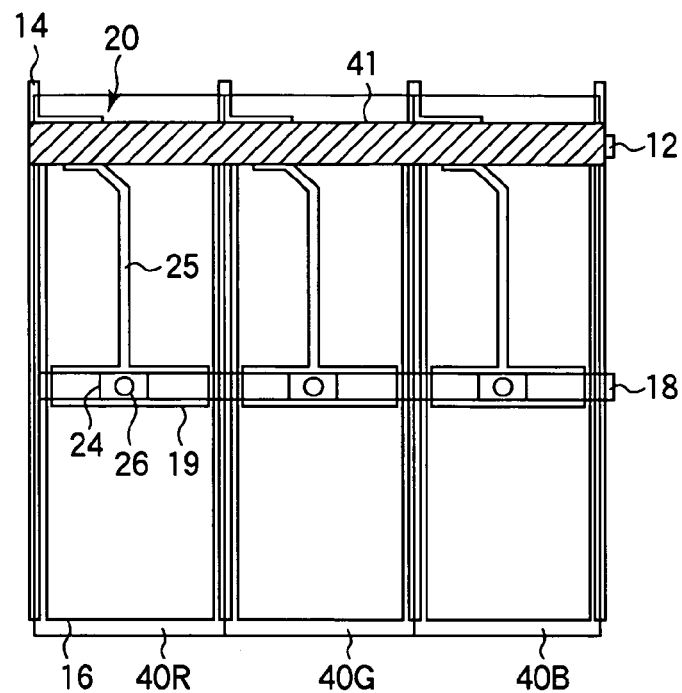
FIG. 8 is a view showing the manufacturing method of the substrate for the liquid crystal display device according to example 1 of the embodiment of the invention.
Figure 9:
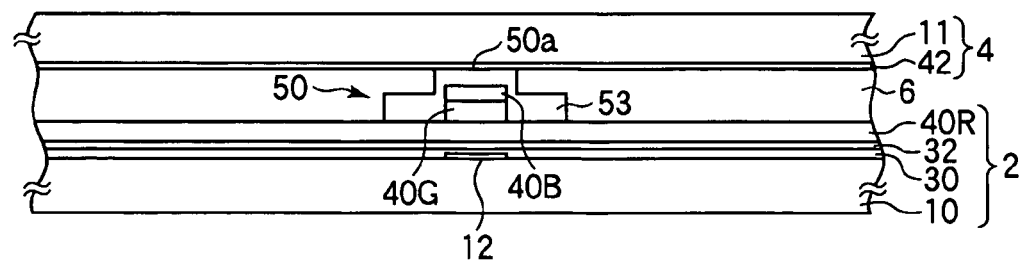
FIG. 9 is a sectional view showing the manufacturing method of the liquid crystal display device according to example 1 of the embodiment of the invention.

Next, as shown in FIG. 8, the protection film is opened by a dry etching method, and a contact hole 26 is formed. Next, a transparent conductive film of ITO or the like is formed on the whole surface of the substrate and patterning is made, so that a pixel electrode 16 is formed in each of the pixel regions. The pixel electrode 16 is electrically connected to the storage capacitor electrode 19 through the contact hole 26. Next, a resin film is coated on the whole surface of the substrate on the pixel electrode 16 and patterning is made, so that an auxiliary spacer layer 53 is formed. The auxiliary spacer layer 53 is arranged at an arrangement density of one per several to several tens of pixels, and is formed to intersect with the resin overlap part 41. By this, a pillar spacer 50 including the resin overlap part (first layer) 41 and the auxiliary spacer layer (second layer) 53 is formed. As already described, even if an overlap shift occurs when the auxiliary spacer layer 53 is formed, the area of the upper bottom surface 50a of the pillar spacer 50 is not changed. Through the above process, the TFT substrate 2 of the COT structure shown in FIGS. 3A and 3B is completed.

Next, as shown in FIG. 9, the TFT substrate 2 is attached to a common electrode substrate 4 in which a common electrode 42 is formed on a glass substrate 11, and a liquid crystal 6 is sealed between both the substrates 2 and 4. Here, since the surface of the common electrode substrate 4 is almost flat, almost the whole surface of the upper bottom surface 50a of the pillar spacer 50 comes in contact with the common electrode substrate 4. That is, when the area of the upper bottom surface 50a is not changed, the contact area of the pillar spacer 50 with respect to the common electrode substrate 4 is not also changed. Thereafter, through a module process in which a driver IC or the like is mounted, the liquid crystal display device is completed. Incidentally, in this example, although the resin overlap part 41 is formed by laminating the three layers of the CF resin layers 40R, 40G and 40B, the resin overlap part 41 may be formed by laminating any two layers of the CF resin layers 40R, 40G and 40B. The height of the pillar spacer 50 can be adjusted by changing the film thickness of the auxiliary spacer layer 53.

EXAMPLE 2

Figure 10:
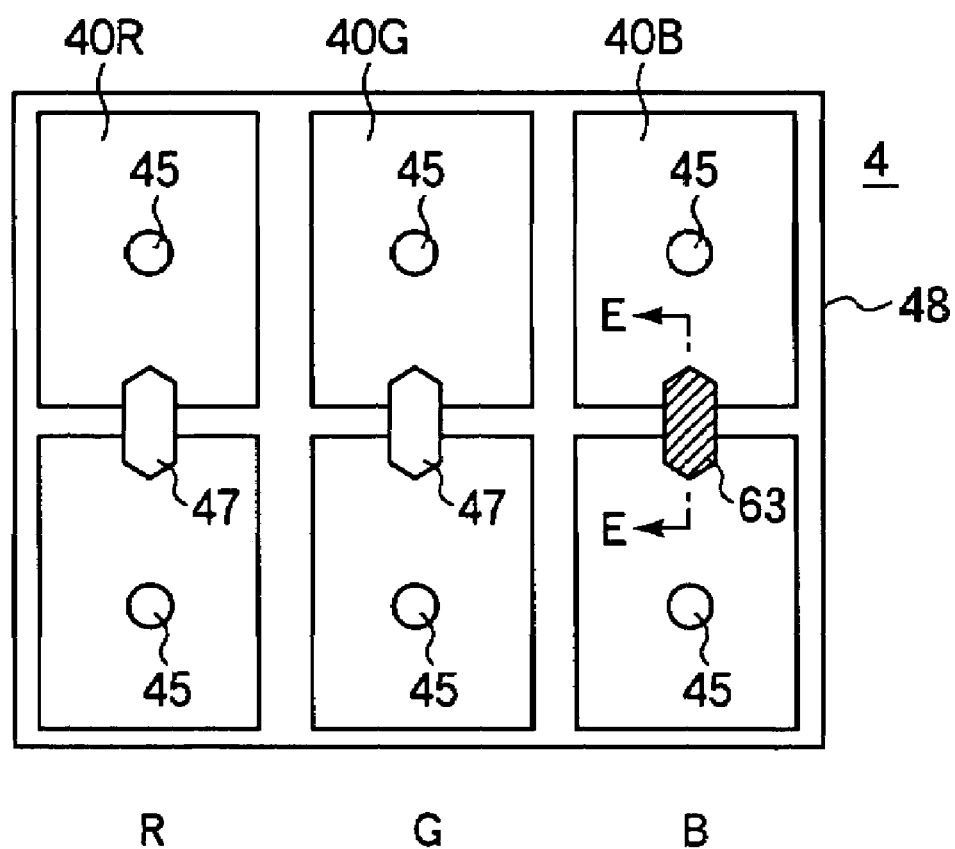
FIG. 10 is a view showing a structure of a common electrode substrate of a liquid crystal display device according to example 2 of the embodiment of the invention.
Figure 11B:
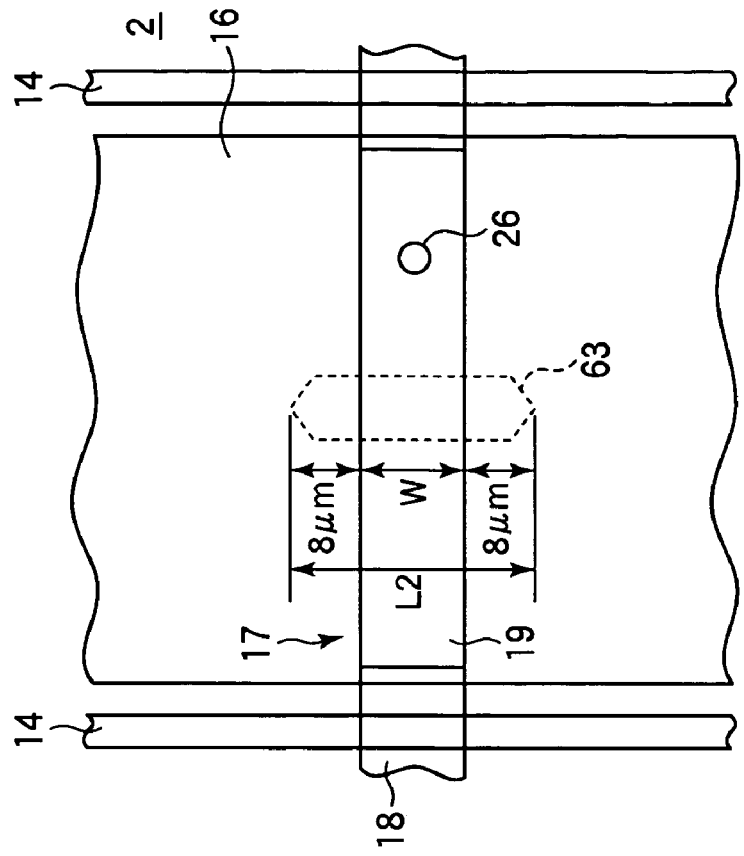
FIGS. 11A and 11B are views showing a structure of a TFT substrate of the liquid crystal display device according to example 2 of the embodiment of the invention.
Figure 11A:
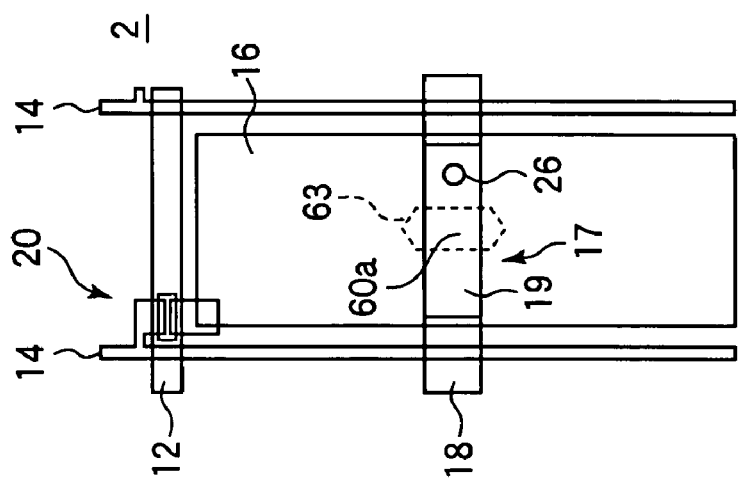
Figure 12:
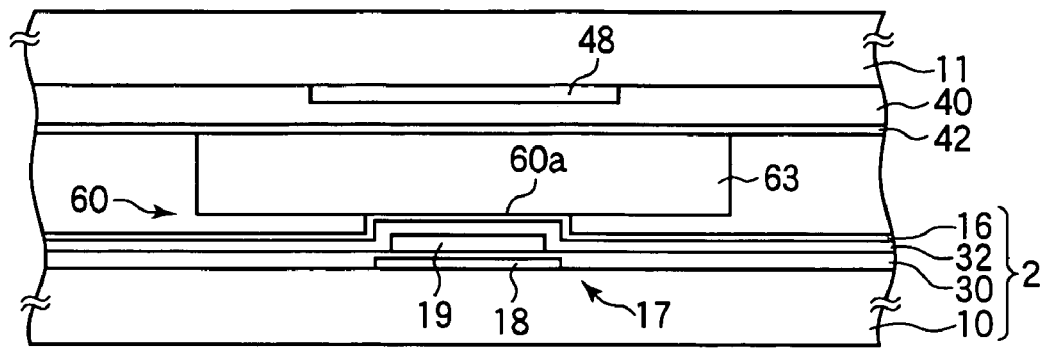
FIG. 12 is a sectional view showing a structure of the liquid crystal display device according to example 2 of the embodiment of the invention.

Next, a liquid crystal display device according to example 2 of this embodiment will be described. FIG. 10 shows a structure of three pixels of a common electrode substrate 4 of the liquid crystal display device according to this example. FIG. 11A shows a structure of one pixel of a TFT substrate 2 of the liquid crystal display device according to this example, and FIG. 11B shows a structure of a vicinity of a storage capacitor part of the TFT substrate 2. FIG. 12 shows a sectional structure of the liquid crystal display device taken at a position corresponding to line E-E of FIG. 10.

As shown in FIGS. 10 to 12, on the common electrode substrate 4, a BM 48 for defining pixel regions and shading a storage capacitor part at the side of the TFT substrate 2 is formed of, for example, chromium (Cr). A CF resin layer 40 (40R, 40G, 40B) of one color of R, G and B is formed in each of the pixel regions. A common electrode 42 is formed on the CF resin layer 40 and on the whole surface of the substrate. As alignment regulating structures for regulating the alignment of a liquid crystal 6, projections 45 and 47 made of dielectric materials are formed on the common electrode 42. In each of the R pixel and the G pixel, there are formed the dot-like projections 45 respectively arranged at two opening parts of a pixel region and the projection 47 overlapping with the region of the BM 48 for shading the storage capacitor part and arranged to protrude to both the opening parts. In the B pixel, there are formed the dot-like projections 45 respectively arranged at two opening parts. Besides, in the B pixel, there is formed a resin layer 63 functioning as a second layer of the pillar spacer 60 instead of the projection 47.

A storage capacitor bus line 18 and a storage capacitor electrode 19 are formed at the center part of the pixel region at the side of the TFT substrate 2, and a storage capacitor part 17 whose height from the surface of a glass substrate 10 is higher than a peripheral opening part is formed. The storage capacitor part 17 functions as a first layer of the pillar spacer 60. When both the substrates 2 and 4 are attached to each other, the storage capacitor part 17 and the resin layer 63 come in contact with each other through a contact interface 60a. A width W of the storage capacitor part 17 is almost constant. A width of the resin layer 63 is almost constant, and a length L2 satisfies a relation of L2≧W+2Y (here, Y denotes an attaching accuracy at the time when both the substrates 2 and 4 are attached). In the state where both the substrates 2 and 4 are attached to each other without a shift, the resin layer 63 protrudes from each of both side end parts of the storage capacitor part 17 by, for example, 8 μm (≧Y).

When an attaching shift of ±5 μm of the substrates 2 and 4 occurs, a size variation of ±1 μm of the resin layer 63 occurs, and an overlap shift of ±4 μm of the resin layer 63 with respect to the common electrode substrate 4 occurs, there is a possibility that a shift of about ±6.5 ($=\sqrt{(5^2+1^2+4^2)}$) μm occurs between the storage capacitor part 17 and the resin layer 63. Since the width of the resin layer 63 is almost constant, and the resin layer 63 is designed to protrude from each of both side end parts of the storage capacitor part 17 by 8 μm, even if the shift of ±6.5 μm occurs in the vertical direction of FIG. 11B, the area of the contact interface 60a of the pillar spacer 60 is not changed. Besides, since the width W of the storage capacitor part 17 is almost constant, even if the shift of ±6.5 μm occurs in the horizontal direction of FIG. 11B, the area of the contact interface 60a of the pillar spacer 60 is not changed.

According to this example, even if the attaching shift between the substrates 2 and 4 occurs in the range of the attaching accuracy Y, the area of the contact interface 60*a* of the pillar spacer 60 is not changed. Besides, when the length L2 is made further long, in addition to the attaching shift, even if the size variation of the resin layer 63, the overlap shift of the resin layer 63 and the like occur, the area of the contact interface 60*a* of the pillar spacer 60 is not changed. Since the hardness of the liquid crystal display panel depends on the area of the contact interface 60*a*, according to this example, even if the attaching accuracy Y, the size accuracy, the overlap accuracy and the like are considered, a poor display and degradation in pressure resistance characteristics due to local uneven cell thickness do not occur. Accordingly, the liquid crystal display device can be realized in which high manufacturing yield and excellent display quality can be obtained.

Incidentally, in the structure of this example, the resin layer 63 functions as an alignment regulating structure. Thus, although the resin layer 63 is arranged to protrude from the BM 48 to the opening part, degradation in display quality hardly occurs. However, as compared with the projection 47, the alignment regulating force on the liquid crystal 6 is high, and there is a case where a light leak of backlight occurs. Accordingly, it is desirable that the resin layer 63 is formed in the B pixel whose transmittance is lowest among the three colors of R, G and B.

Besides, in this example, although the resin layer 63 is designed to protrude from each of both the side end parts of the storage capacitor part 17 by 8 μm, in view of the magnitude of a manufacture variation, it may be smaller than 8 μm. For example, in the case where the attaching shift of the substrates 2 and 4 is ±4 μm, the overlap shift of the resin layer 63 with respect to the common electrode substrate 4 is ±3 μm, and the size variation of the resin layer 63 is ±1 μm, there is a possibility that a shift of about ±5 ($=\sqrt{(4^2+3^2+1^2)}$) μm occurs between the storage capacitor part 17 and the resin layer 63. Accordingly, in this case, the length by which the resin layer 63 protrudes from each of both the side end parts of the storage capacitor part 17 may be 5 μm.

EXAMPLE 3

Figure 13:
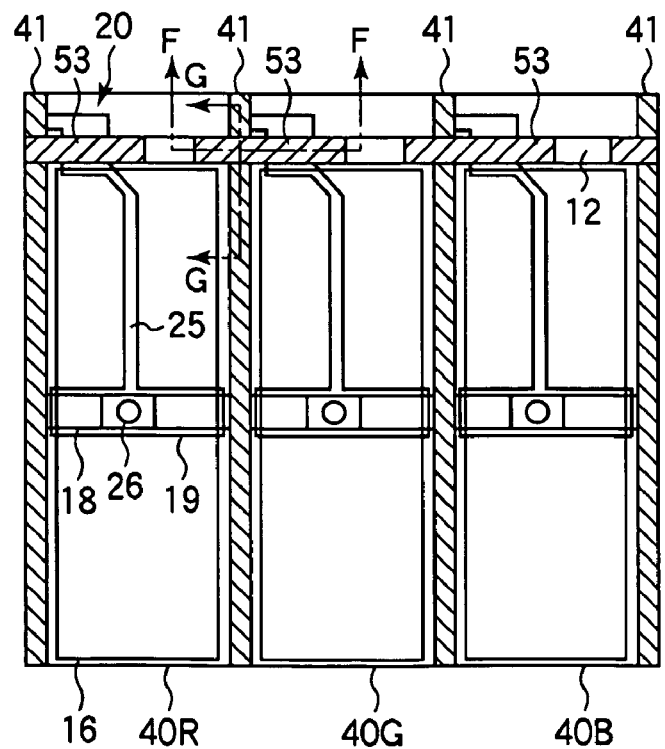
FIG. 13 is a view showing a structure of a substrate for a liquid crystal display device according to example 3 of the embodiment of the invention.
Figure 14:
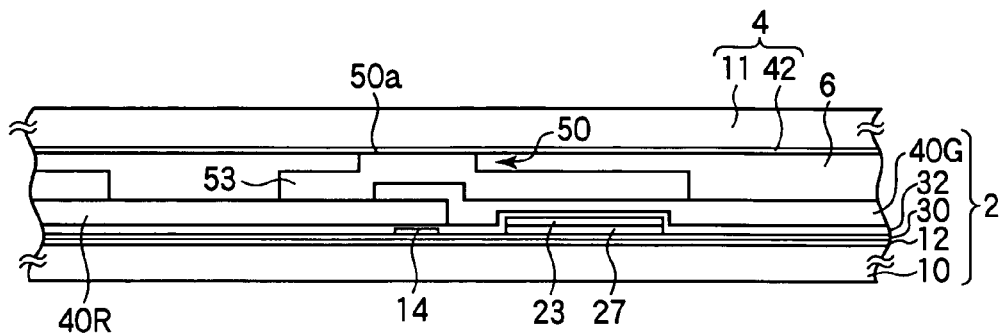
FIG. 14 is a sectional view showing a structure of a liquid crystal display device according to example 3 of the embodiment of the invention.
Figure 15:
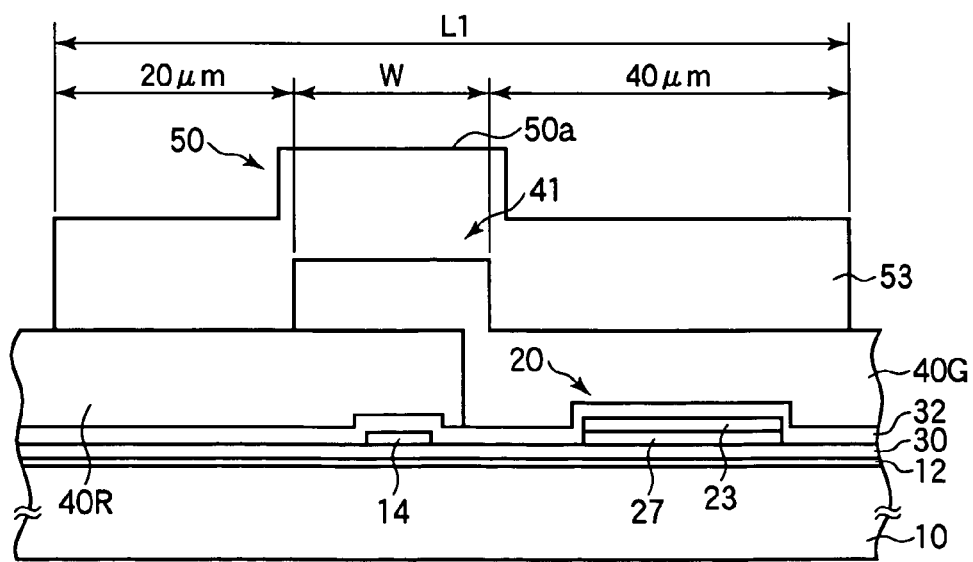
FIG. 15 is a sectional view showing a structure of the substrate for the liquid crystal display device according to example 3 of the embodiment of the invention.
Figure 16:
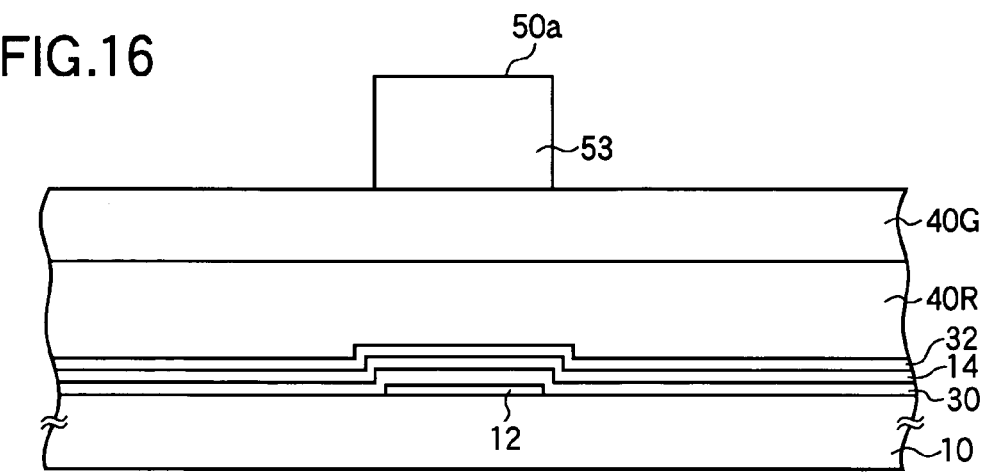
FIG. 16 is a sectional view showing a structure of the substrate for the liquid crystal display device according to example 3 of the embodiment of the invention.

Next, a substrate for a liquid crystal display device according to example 3 of this embodiment and a liquid crystal display device including the same will be described. FIG. 13 shows a structure of a TFT substrate of a COT structure according to this example. FIG. 14 shows asectional structure of a liquid crystal display device taken along line F-F of FIG. 13, and FIG. 15 shows a sectional structure of the TFT substrate taken at the same position. FIG. 16 shows a sectional structure of the TFT substrate taken along line G-G of FIG. 13.

As shown in FIGS. 13 to 16, in this example, a resin overlap part 41 in which adjacent two layers among CF resin layers 40R, 40G and 40B are laminated is formed on a drain bus line 14. The resin overlap part 41 linearly extends along the drain bus line 14, and has an almost constant width W. An auxiliary spacer layer 53 is formed on the resin overlap part 41. The auxiliary spacer layer 53 is almost orthogonal to the resin overlap part 41, and extends along a gate bus line 12. The resin overlap part 41 functions as a first layer of a pillar spacer 50, and the auxiliary spacer layer 53 functions as a second layer of the pillar spacer 50. A width of the auxiliary spacer layer 53 is almost constant, and its length L1 satisfies a relation of L1≧W+2X (here, X denotes an overlap accuracy of an exposure device used when the auxiliary spacer layer 53 is patterned). As shown in FIG. 15, in the state where ideal patterning is made, the auxiliary spacer layer 53 protrudes from a side end of the auxiliary spacer layer 41 at a TFT 20 side by 40 μm (≧X), and is arranged so as to cover the TFT 20. Besides, the auxiliary spacer layer 53 protrudes from the other side end of the resin overlap part 41 by, for example, a length of 20 μm (≧X). When the substrate is attached to a common electrode substrate 4, an upper bottom surface 50*a* of the pillar spacer 50 comes in contact with the surface of the common electrode substrate 4.

In this example, since the width of the auxiliary spacer layer 53 is almost constant, and the auxiliary spacer layer 53 is designed to protrude from each of both the side end parts of the resin overlap part 41 by the length not smaller than the overlap accuracy X of the exposure device, even if an overlap shift in the horizontal direction in FIG. 13 occurs in the auxiliary spacer layer 53, the area of the upper bottom surface 50*a* of the pillar spacer 50 is not changed. Besides, since the width W of the resin overlap part 41 is almost constant, even if an overlap shift in the vertical direction in FIG. 13 occurs in the auxiliary spacer layer 53, the area of the upper bottom surface 50*a* of the pillar spacer 50 is not changed. Accordingly, according to this example, similarly to example 1, a poor display and degradation in pressure resistance characteristics due to local uneven cell thickness do not occur, and the liquid crystal display device can be realized in which high manufacturing yield and excellent display quality can be obtained.

Incidentally, in this example, although the resin overlap part 41 is formed on the drain bus line 14, the resin overlap part 41 may be formed on both the gate bus line 12 and the drain bus line 14. In this case, the auxiliary spacer layer 53 is arranged on an intersecting point of the lattice-like resin overlap parts 41, and is formed into, for example, a square shape. The width (length) of the auxiliary spacer layer 53 in the direction parallel to the gate bus line 12 and the width (length) in the direction parallel to the drain bus line 14 are respectively made not smaller than the sum of the width W of the resin overlap part 41 and twice the overlap accuracy X of the exposure device used when the auxiliary spacer layer 53 is patterned.

EXAMPLE 4

Figure 17:
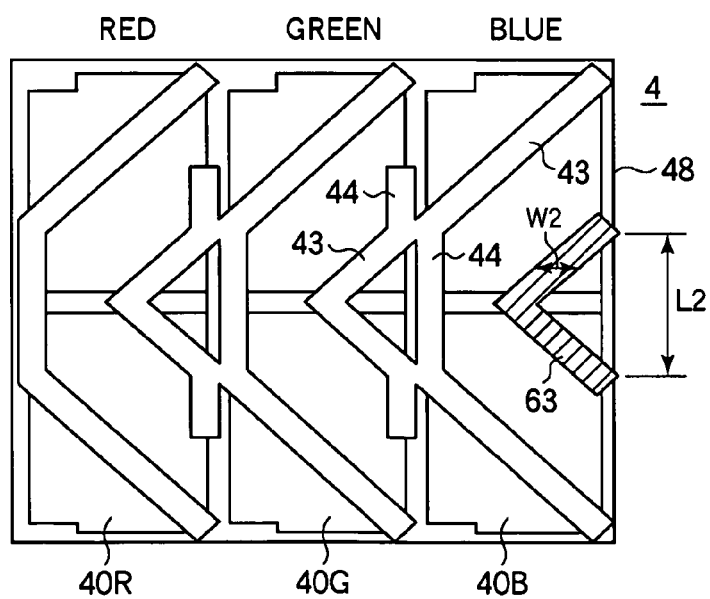
FIG. 17 is a view showing a structure of a substrate for a liquid crystal display device according to example 4 of the embodiment of the invention.

Next, a liquid crystal display device according to example 4 of this embodiment will be described. FIG. 17 shows a structure of three pixels of a common electrode substrate 4 of the liquid crystal display device according to this example. As shown in FIG. 17, as alignment regulating structures for regulating the alignment of liquid crystal, the common electrode substrate 4 includes a linear projection 43 extending obliquely with respect to a pixel region end part and an auxiliary projection 44 branching from the linear projection 43 and extending in parallel to the pixel region end part. The linear projection 43 and the auxiliary projection 44 are formed at the same time by using, for example, a positive resist. In a part of a B pixel, instead of the linear projection 43, there is formed a resin layer 63 extending almost in parallel to the linear projection 43 and functioning as a second layer of a pillar spacer 60. The resin layer 63 is formed of, for example, acryl resin.

Figure 18:
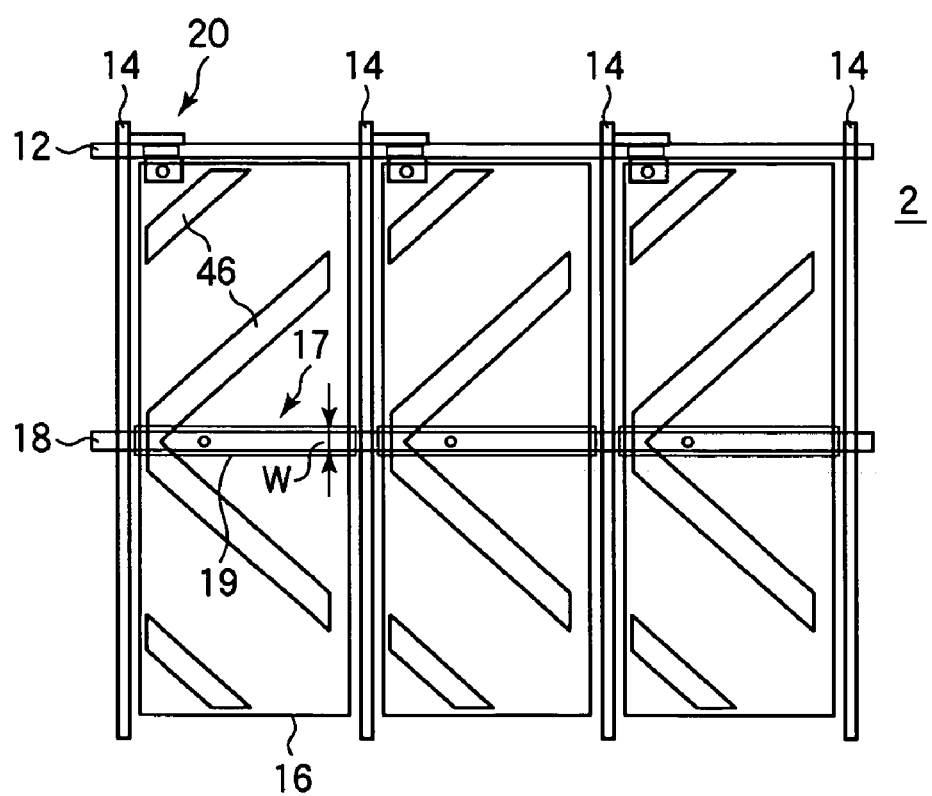
FIG. 18 is a view showing a structure of the substrate for the liquid crystal display device according to example 4 of the embodiment of the invention.

FIG. 18 shows a structure of three pixels of a TFT substrate 2. As shown in FIG. 18, a slit 46 extending obliquely with respect to a pixel region end part and functioning as an alignment regulating structure is formed in a pixel electrode 16 on the TFT substrate 2. When the TFT substrate 2 and the common electrode substrate 4 are attached to each other, the linear projection 43 and the slit 46 are shifted from each other by a half pitch and are arranged in parallel to each other. Besides, a storage capacitor part 17 whose height from a glass substrate surface is higher than a peripheral opening part is formed on the TFT substrate 2. The storage capacitor part 17 functions as a first layer of the pillar spacer 60. A width of the storage capacitor part 17 is almost constant. Besides, a width W2 of the resin layer 63 in the direction in which the storage capacitor part 17 extends is almost constant, and its length L2 in the direction orthogonal to the direction in which the storage capacitor part 17 extends satisfies a relation of L2≧W+2Y (here, Y denotes an attaching accuracy when both the substrates 2 and 4 are attached).

Figure 19A:
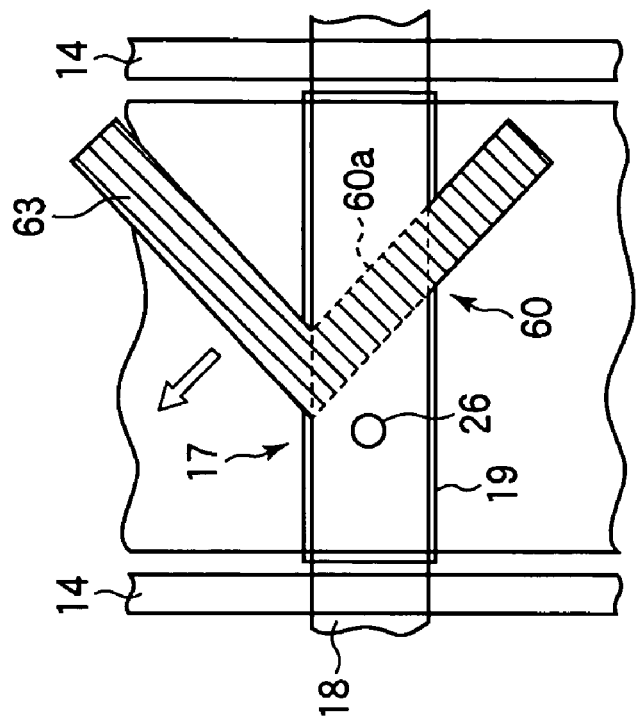
FIGS. 19A and 19B are views showing the arrangement of a resin layer and a storage capacitor part of a liquid crystal display device according to example 4 of the embodiment of the invention.
Figure 19B:
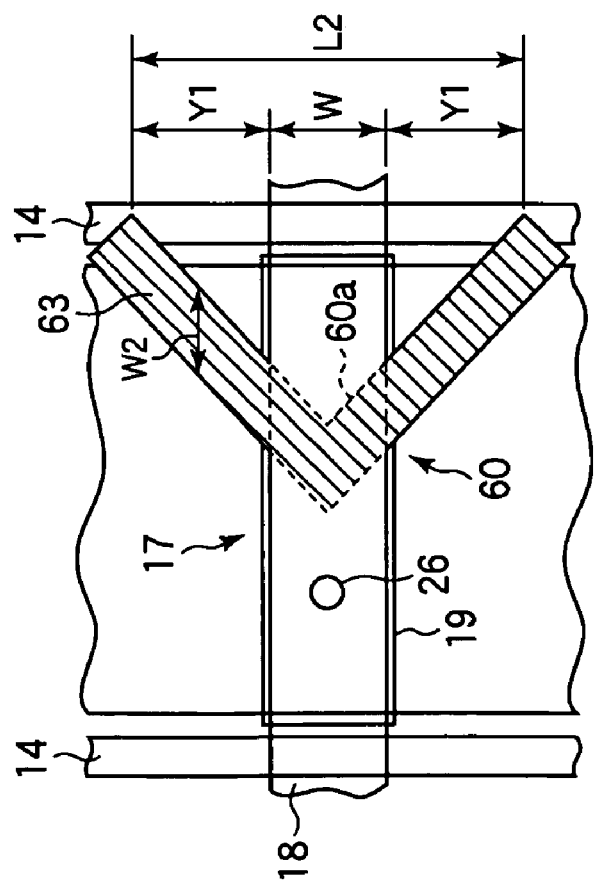
Figure 20:
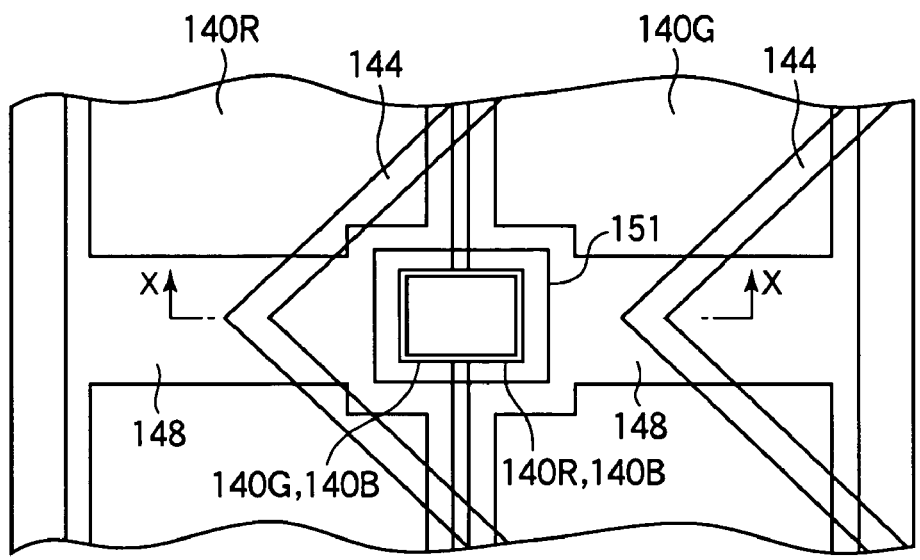
FIG. 20 is a view showing a structure of an opposite substrate of a conventional liquid crystal display device.
Figure 21:
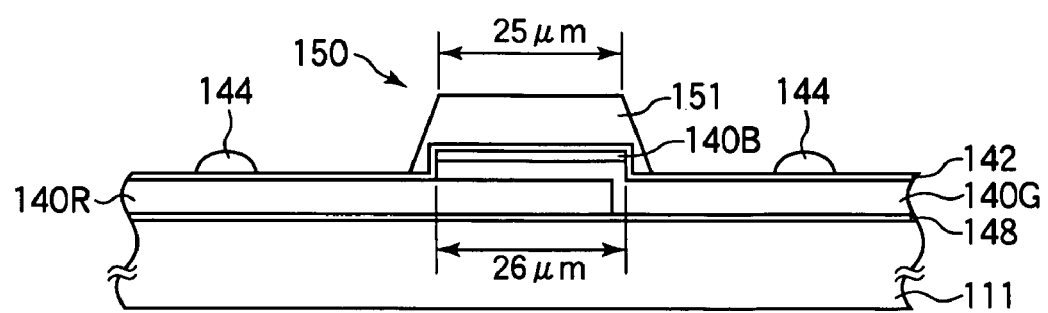
FIG. 21 is a sectional view showing a structure of the opposite substrate of the conventional liquid crystal display device.
Figure 22:
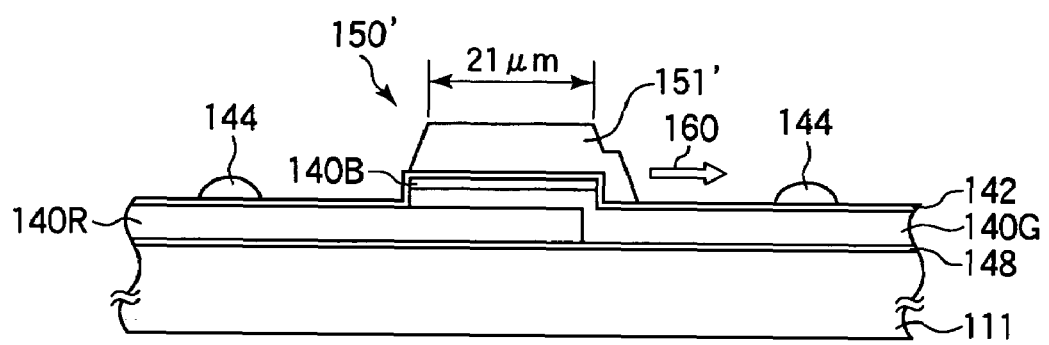
FIG. 22 is a sectional view showing a structure of the opposite substrate in which an overlap shift occurs in an auxiliary spacer layer.
Figure 23:
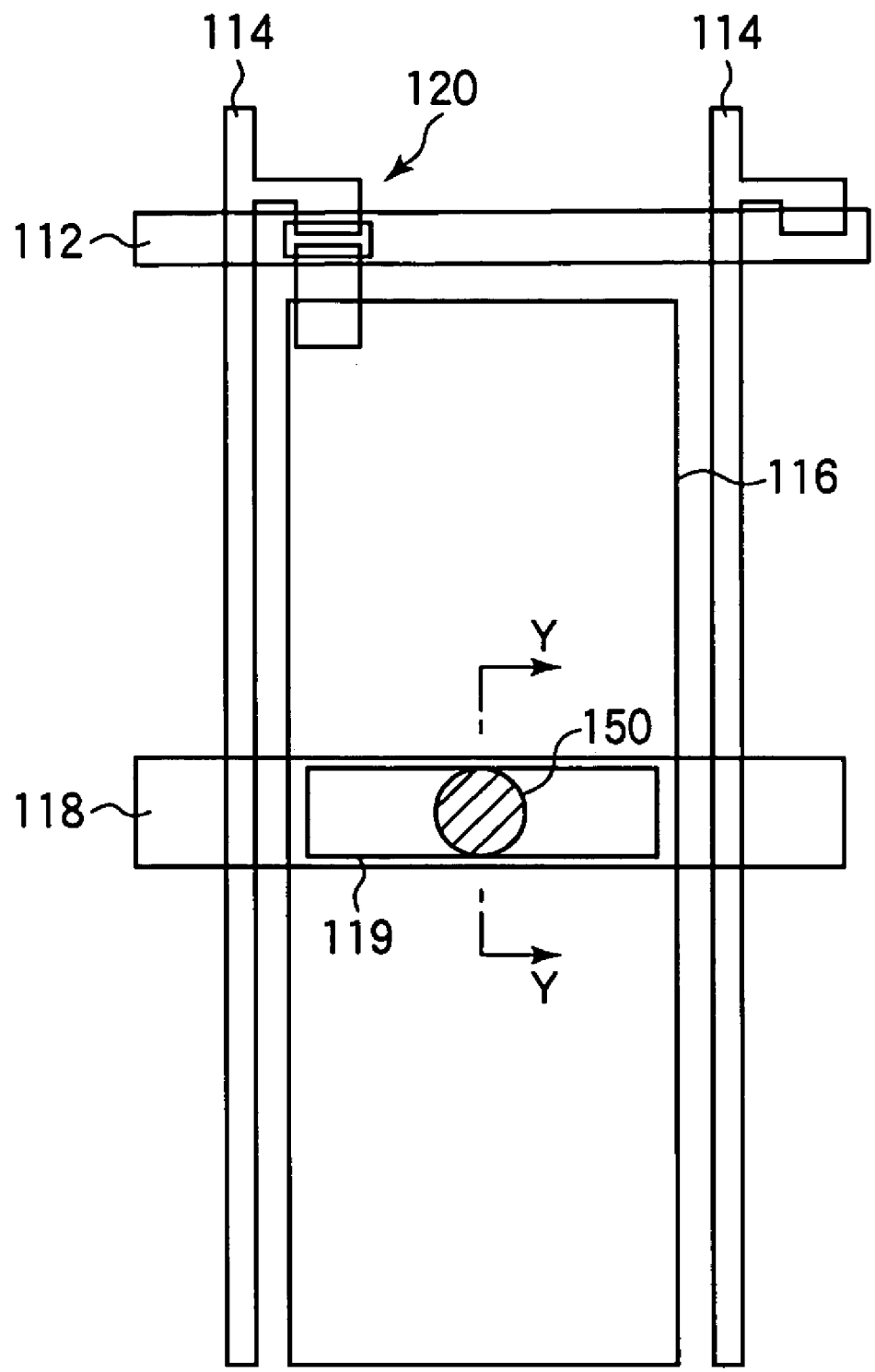
FIG. 23 is a view showing a structure of another conventional liquid crystal display device.
Figure 24:
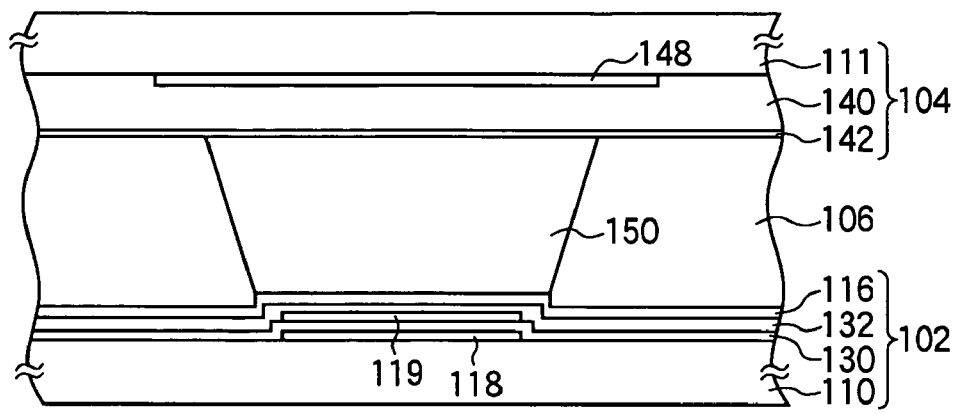
FIG. 24 is a sectional view showing a structure of the another conventional liquid crystal display device.
Figure 25:
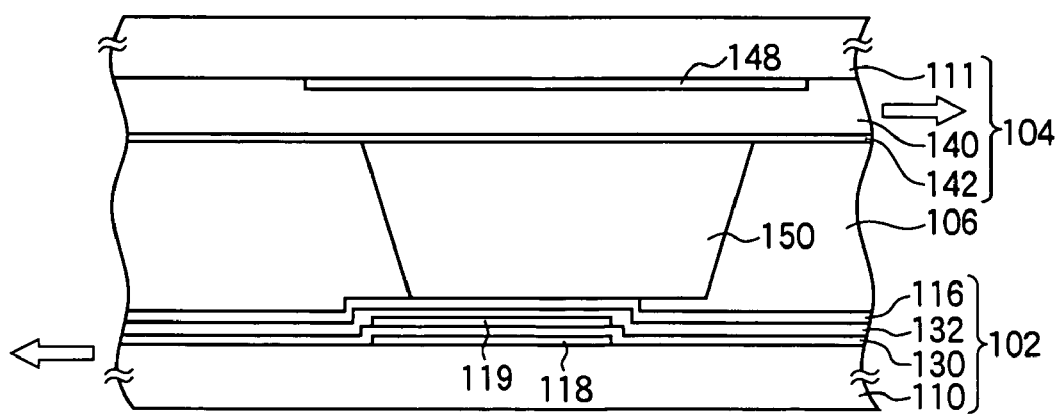
FIG. 25 is a sectional view showing a structure of the liquid crystal display device in which an attaching shift occurs.

FIG. 19A shows the arrangement of the resin layer 63 and the storage capacitor part 17 at the time when the TFT substrate 2 and the common electrode substrate 4 are attached to each other without a shift. As shown in FIG. 19A, the resin layer 63 protrudes from each of both side end parts of the storage capacitor part 17 by a length Y1 (for example, 8 μm or more). FIG. 19B shows a state in which the common electrode substrate 4 is shifted from the TFT substrate 2 by about 8 μm in the direction of an arrow in the drawing (upper left direction) and is attached thereto. In the structure of this example, the width W2 of the resin layer 63 is almost constant, and the resin layer 63 is designed to protrude from each of both the side end parts of the storage capacitor part 17 by the length Y1. Accordingly, even if an attaching shift occurs in the vertical direction in the drawing, the area of the contact interface 60a of the pillar spacer 60 is not changed. Besides, since the width W of the storage capacitor part 17 is almost constant, even if the attaching shift occurs in the horizontal direction in the drawing, the area of the contact interface 60a of the pillar spacer 60 is not changed. That is, as shown in FIG. 19B, even if the attaching shift occurs in the oblique direction, the area of the contact interface 60a of the pillar spacer 60 is not changed. Since the shift amount occurring actually when the substrates 2 and 4 are attached is 8 μm or less, a sufficient attaching margin is secured. According to this example, a poor display and degradation in pressure resistance characteristics due to local uneven cell thickness do not occur, and the liquid crystal display device can be realized in which high manufacturing yield and excellent display quality can be obtained.

Incidentally, in the structure of this example, the resin layer 63 functions also as the alignment regulating structure. Thus, although the resin layer 63 is arranged to protrude from the BM48 to the opening part, degradation in display quality hardly occurs. However, as compared with the linear projection 43, the alignment regulating force on the liquid crystal 6 is high, and there is a case where a light leak of backlight occurs, and accordingly, it is desirable that the resin layer 63 is formed in the B pixel whose transmittance is lowest among the three colors of R, G and B.

The invention is not limited to the above embodiment, but can be variously modified.

For example, in the embodiment, although the transmissive liquid crystal display device is cited as the example, the invention is not limited to this, but can also be applied to a reflective or semi-transparent liquid crystal display device.

Besides, in the above embodiment, although the liquid crystal display device including the channel protection film type TFTs is cited as the example, the invention is not limited to this, but can be applied to a liquid crystal display device including channel etch type TFTs.

Further, in the above embodiment, although the liquid crystal display device in which the electrode is formed on each of the opposite surfaces of the pair of substrates arranged to be opposite to each other is cited as the example, the invention is not limited to this, but can be applied to a liquid crystal display device of an IPS mode in which an electrode is formed on only one of a pair of substrates.

What is claimed is:

1. A substrate for a liquid crystal display device, comprising:
    a base substrate for holding a liquid crystal in cooperation with an opposite substrate arranged to be opposite thereto; and
    a pillar spacer provided to maintain a cell gap between the base substrate and the opposite substrate,
    wherein the pillar spacer includes a first layer formed on the base substrate to linearly extend in a first direction and to have an almost constant width W in a second direction orthogonal to the first direction, and a second layer which is patterned to partially overlap with the first layer at an overlap accuracy X and in which a width in the first direction is almost constant and a length L1 in the second direction satisfies a relation of L1≧W+2X.

2. A substrate for a liquid crystal display device according to claim 1, wherein the second layer linearly extends in the second direction.

3. A substrate for a liquid crystal display device according to claim 2, wherein the first layer includes a resin overlap part in which a plurality of color filter layers are laminated.

4. A substrate for a liquid crystal display device according to claim 2, further comprising a plurality of bus lines formed on the base substrate to intersect with each other through an insulating film,
    wherein the first layer is formed on the bus lines.

5. A substrate for a liquid crystal display device according to claim 4, further comprising a thin film transistor formed in a vicinity of each of intersecting positions of the plurality of bus lines,
    wherein the first layer is formed to cover the thin film transistor.

6. A substrate for a liquid crystal display device according to claim 1, wherein the first layer includes a resin overlap part in which a plurality of color filter layers are laminated.

7. A substrate for a liquid crystal display device according to claim 6, further comprising a plurality of bus lines formed on the base substrate to intersect with each other through an insulating film,
    wherein the first layer is formed on the bus lines.

8. A substrate for a liquid crystal display device according to claim 7, further comprising a thin film transistor formed in a vicinity of each of intersecting positions of the plurality of bus lines,
    wherein the first layer is formed to cover the thin film transistor.

9. A substrate for a liquid crystal display device according to claim 1, further comprising a plurality of bus lines formed on the base substrate to intersect with each other through an insulating film,
    wherein the first layer is formed on the bus lines.

10. A substrate for a liquid crystal display device according to claim 9, further comprising a thin film transistor formed in a vicinity of each of intersecting positions of the plurality of bus lines,
    wherein the first layer is formed to cover the thin film transistor.

11. A substrate for a liquid crystal display device according to claim 1, wherein the second layer is patterned by using a mirror projection exposure system, and the length L1 satisfies a relation of $L1 \geqq W+3$ μm.

12. A substrate for a liquid crystal display device according to claim 1, wherein the second layer is patterned by using a proximity exposure system, and the length L1 satisfies a relation of $L1 \geqq W+6$ μm.

13. A liquid crystal display device comprising a pair of substrates arranged to be opposite to each other, and a liquid crystal sealed between the pair of substrates, wherein a substrate for a liquid crystal display device according to claim 1 is used as one of the pair of substrates.

14. A liquid crystal display device comprising:

a pair of substrates attached to each other at an attaching accuracy Y;

a liquid crystal sealed between the pair of substrates; and a pillar spacer provided to maintain a cell gap between the pair of substrates, wherein the pillar spacer includes a first layer formed on one of the pair of substrates to linearly extend in a first direction and to have an almost constant width W in a second direction orthogonal to the first direction, and a second layer which is formed on the other of the pair of substrates to partially overlap with the first layer and in which a width in the first direction is almost constant and a length L2 in the second direction satisfies a relation of $L2 \geqq W+2Y$.

15. A liquid crystal display device according to claim 14, wherein the length L2 satisfies a relation of $L2 \geqq W+8$ μm.

* * * * *